Figure 1:
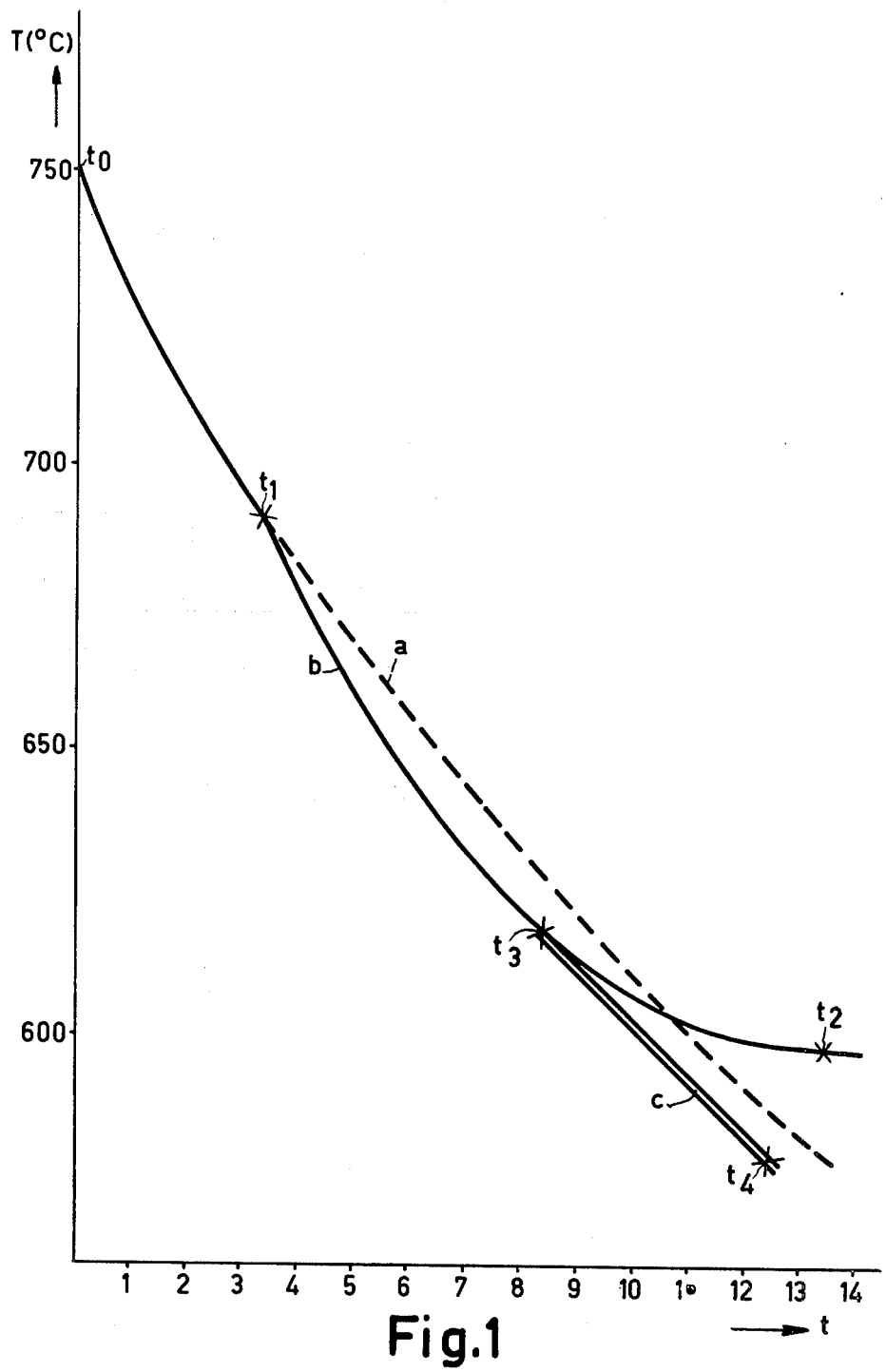

United States Patent [19]

in'T Veld et al.

[11] 3,958,971

[45] May 25, 1976

[54] METHOD OF MANUFACTURING A TUBULAR LAMP ENVELOPE

[75] Inventors: Jan Man in'T Veld; Adrianus Antonius Hurx, both of Eindhoven, Netherlands

[73] Assignee: U.S. Philips Corporation, New York, N.Y.

[22] Filed: Nov. 21, 1974

[21] Appl. No.: 525,935

[30] Foreign Application Priority Data
Dec. 13, 1973   Netherlands...................... 7317073

[52] U.S. Cl.................................. 65/108; 65/281; 294/64 R
[51] Int. Cl.² .................... C03B 23/06; C03B 23/08
[58] Field of Search ............ 65/108, 109, 110, 276, 65/281, 34, 103; 294/64 R, 64 A, 64 B, 65

[56] References Cited
UNITED STATES PATENTS 2,494,871   1/1950   Greiner................................ 65/281
2,494,923   1/1950   Yoder et al............................ 65/34
3,302,803   1/1967   Mooney............................ 294/64 X

*Primary Examiner*—Arthur D. Kellogg
*Attorney, Agent, or Firm*—Frank R. Trifari

[57] ABSTRACT

The invention relates to a method of manufacturing a torus-shaped lamp envalope in which a straight tube is softened by heating and is then bent in a vertical plane around a bending mould and is again cooled after which the cooperation of the still slightly soft tube with the bending mould is interrupted as soon as the tube is supported by a supporting member.

The invention further relates to a fluorescent lamp having a lamp envelope thus shaped, as well as a device for carrying out the method.

2 Claims, 8 Drawing Figures

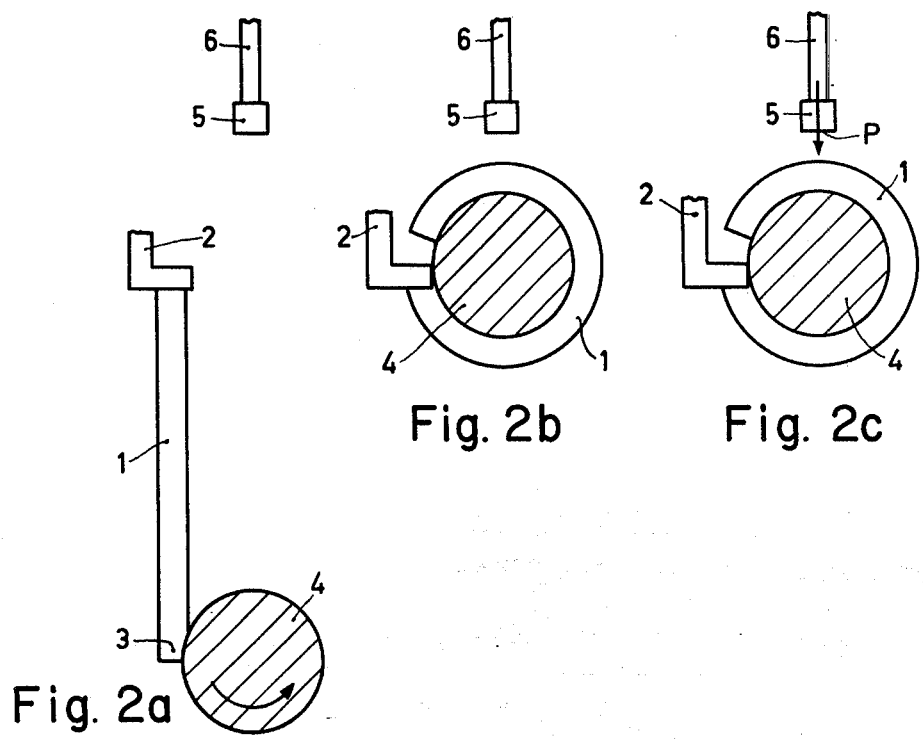
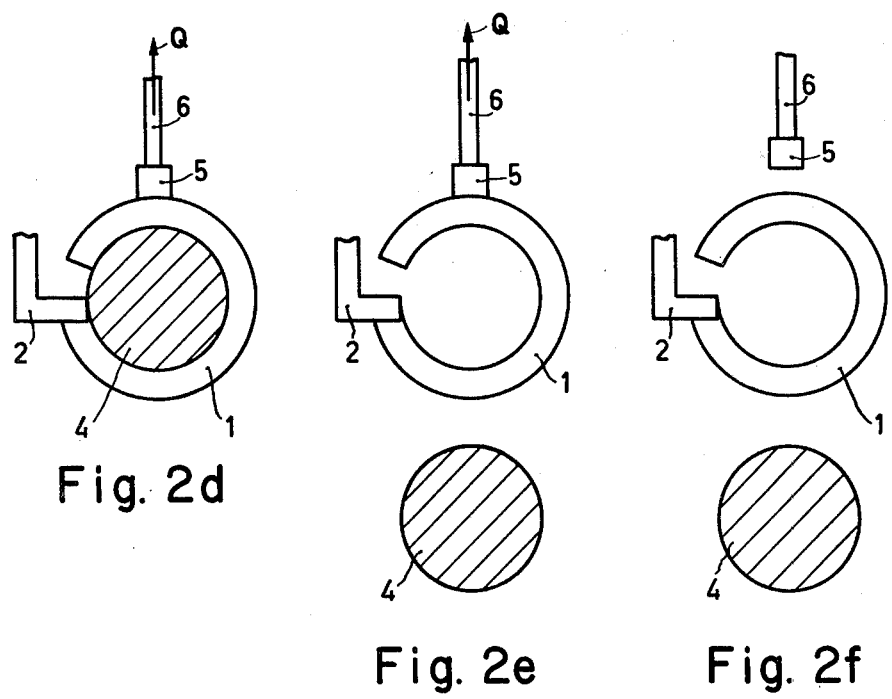
Fig. 2a Fig. 2b Fig. 2c
Fig. 2d Fig. 2e Fig. 2f

METHOD OF MANUFACTURING A TUBULAR LAMP ENVELOPE

The invention relates to a method of manufacturing a torus-shaped lamp envelope which is particularly suitable for a fluorescent lamp of which the lamp envelope shows a curved shape, in which method a straight tube is softened by heating and then bent in a vertical plane around a bending mould, after which the tube is cooled to a temperature at which deformation of the shape of the torus as a result of gravity does not occur. Such a method is known.

The starting material in said known method is a straight glass tube which is preferably coated on the inside with a fluorescent powder and which is suspended in a holder with one of its ends. Said tube is heated in a furnace to such a temperature that the glass softens, after which the lower end of the tube is clamped in a pair of tongs occurring on a bending mould. Said bending mould is then rolled upwards vertically along the tube so that the soft tube is wound on the bending mould. In this wound condition the tube should be cooled in order that the glass becomes rigid again. As soon as this is the case, the tube may be removed from the bending mould so that the latter is available for bending the next tube.

The time required for the tube to become rigid again, i.e. the time which is necessary in the known method to cool the tube after rolling on the bending mould to a temperature at which the shape of the tube which is no longer supported by the bending mould does not vary any longer as a result of gravity, is approximately 10 seconds in the known method. Although the said solidification time can be reduced slightly by a forced cooling with air of the wound tube, said operation has the drawback that stresses are produced in the material of the tube which are to be removed in a later stage by an extra thermal treatment.

It is the object of the invention to provide a method which enables more rapid interruption of the cooperation of the wound tube with the tube mould than is possible in the known method without any undesired deformation of the shape of the wound tube occurring.

For that purpose the method of the above-denoted kind is characterized according to the invention in that, at an instant between the instant at which the bending operation is completed and the instant at which the temperature is reached, the tube is made to cooperate with at least one supporting member which supports the tube from that instant on, the cooperation of the bending mould with the tube being interrupted after the cooperation of the supporting member with the tube has been effected. This measure is based on the recognition that the undesired deformation of the tube as a result of gravity is counteracted sufficiently when, after the tube has solidified slightly on the bending mould, the support of the tube by the bending mould is taken over by one or more supporting members which hold the tube in one or more places of its circumference. The bending mould is then available again for bending the next tube so that the production speed can be increased.

A favourable embodiment of the method according to the invention is characterized in that the supporting member is made to cooperate with the tube in a place above the centre of the torus. In that case the supporting member is at approximately three quarters of the tube length taken from the end of the tube which is clamped in a holder. It has been found experimentally that in said position of the supporting member deformation of the tube does not occur.

A further favorable embodiment of the method according to the invention is characterized in that the supporting member is in the form of a suction tool which is connected to a suction line and is designed to be placed against the outer circumference of the bent tube. Of course the shape of the suction tool should be adapted to the curvature of the surface of the tube. Prior to effecting the cooperation of the suction tool with the tube, the part of the outer circumference of the tube present opposite to the suction tool is preferably cooled by means of a cooling gas which is blown on the tube via the suction tool. Due to said measure the local deformation, i.e. deformation near the suction tool, of the glass is prevented when the still slightly soft tube is supported by the suction tool.

The invention furthermore relates to a fluorescent lamp which has a curved tubular lamp envelope which is manufactured according to the above-described method.

The invention furthermore relates to a device for manufacturing a torus-shaped lamp envelope which is particularly suitable for a fluorescent lamp, which device comprises a bending mould as well as means to bend a straight tube around said bending mould, which device furthermore comprises at least one supporting member which is movable relative to the bent tube so as to support the torus-shaped tool and is characterized according to the invention in that the supporting member is in the form of a suction tool which can be connected to a suction line and which is designed to cooperate with the outer wall of the bent tube. Of course, the shape of the suction tool is determined by the curvature and the diameter of the bent tube. The suction tool is preferably also connected to a supply line for a cooling gas which can be closed. By means of this device the method according to the invention may be used.

Figure 3:
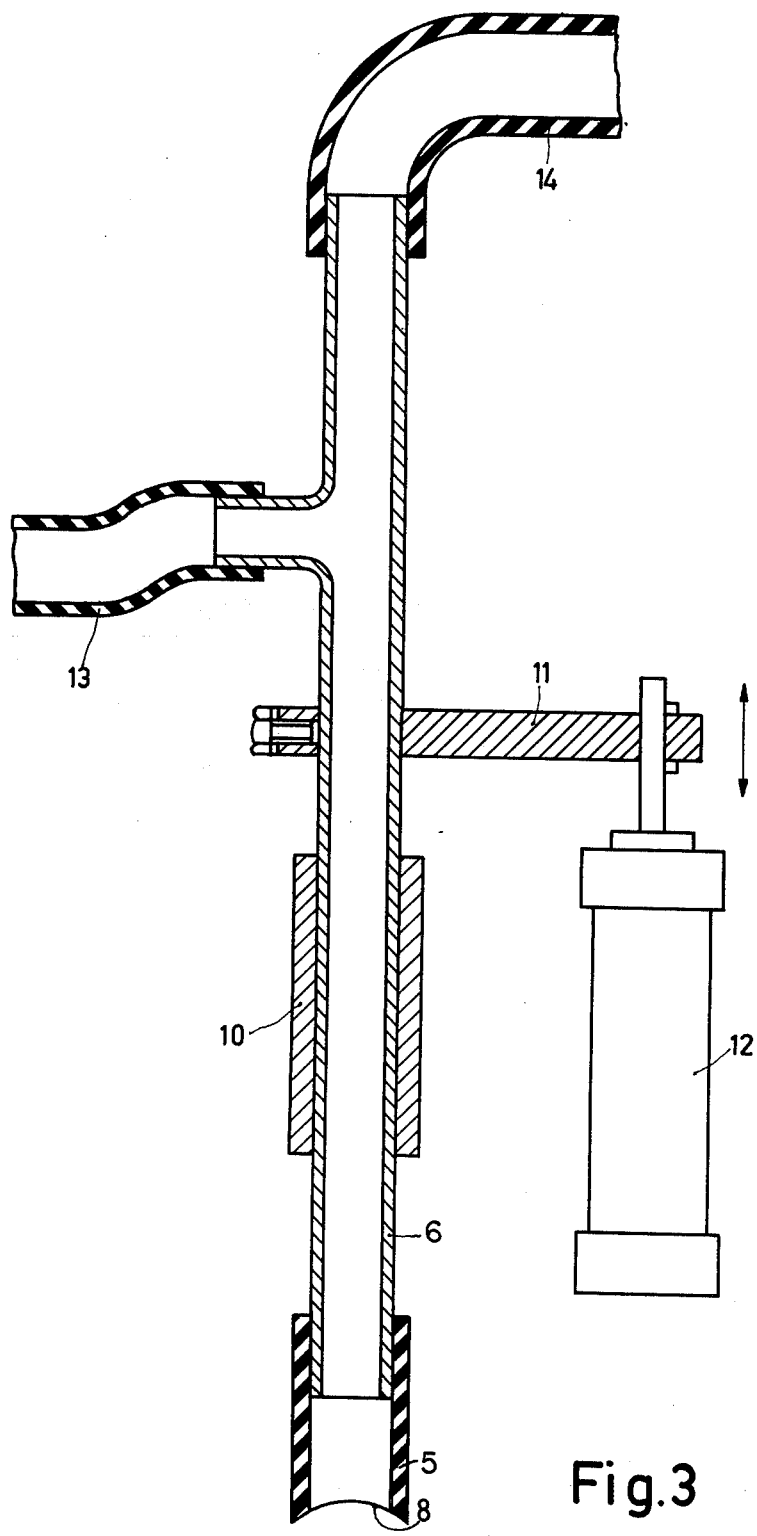

The invention will now be described in greater detail with reference to the drawing, in which FIG. 1 shows the variation of the temperature of the tube during and after bending, FIGS. 2a–2f shows diagrammatically the sequential positions which the most important components of the device according to the invention assume during successive stages, and FIG. 3 shows an embodiment of a suction tool with the line connected thereto used in the device according to the invention.

Prior to the bending operation, the glass tube to be treated is heated in a furnace to a temperature which in the embodiment referred to in FIG. 1 is approximately 750°C. At the instant $t_o$ the tube which is suspended in a holder is removed from the furnace and is placed against a bending mould after which the lower end of the tube is clamped in a pair of tongs connected to the bending mould. The bending mould is rolled upwards vertically along the tube, the tube being bent on the bending mould. These operations are complete at the instant $t_1$, that is to say after approximately 3.5 seconds. The tube then has a temperature of approximately 690°C. From the instant $t_1$, upon further cooling the tube, a difference can be observed between the temperature of the outer circumference of the bent tube cooled in air and that of the inner circumference which engages the bending mould. The temperature variation of the outer circumference is denoted by the broken line $a$, the temperature variation of the inner circumference by the solid line $b$. (Of course a difference in the temperature of the inner and outer circumferences of the tube exists already at the instant at which the tube is contacted with the bending mould. However, this difference is negligibly small and is therefore not expressed in FIG. 1).

In the known method the cooperation of the tube with the bending mould is interrupted at the instant $t_2$. At that instant the temperature of the inner circumference of the tube is approximately 600°C and the temperature of the outer circumference is approximately 580°C. At said temperatures the material of the glass has solidified so that the tube which is held in a vertical plane and is supported at one end by the holder will not experience any deformations as a result of gravity. As appears from FIG. 1, the tube, after completion of the bending operation, should hence be held another approximately 10 seconds on the bending mould for cooling. Of course, the bending mould is not available during said period for bending the next tube.

As already stated in the preamble, the required cooling time may be reduced slightly by a forced cooling with air of the lamp envelope. However, this cooling air mainly influences the temperature of the outer circumference of the tube not engaging the bending mould. The inner circumference of the tube, also when cooling air is supplied, will cool according to the line $b$ of FIG. 1. The result of this is that the temperature difference of the inner and outer circumference at an instant $t_2$ is larger when using cooling air, which results in larger stresses in the glass material.

In the method according to the invention the tube is supported from the instant $t_3$ by one or more supporting members. The temperature of the inner and outer circumferences, respectively, of the tube at that instant is approximately 620°C and 630°C, respectively. When the bending mould would be removed at said temperatures without replacing the bending mould by other supporting means, the shape of the torus would deform under the influence of gravity. However, said deformation does not occur when one or more supporting members are used. It has even been found that one supporting member is sufficient when same is made to cooperate with the lamp envelope above the centre of the torus.

As soon as the supporting function of the bending mould is taken over by one or more supporting members at the instant $t_3$, the bending mould may be removed and hence becomes available for bending the next tube. It has been found that as a result of this a 25% higher production rate can be achieved. After removing the bending mould, the inner circumference of the torus-shaped lamp envelope is cooled according to the double solid line $c$. At the instant $t_4$ the lamp envelope has cooled to such a extent that the cooperation of the supporting member with the lamp envelope can be interrupted without the risk of deformation of the shape of the torus. In addition to the advantage of a higher production rate, the method according to the invention has the advantage that the stresses produced in the glass are smaller than is the case in the known method because, as appears from FIG. 1, the difference between the temperatures of the inner and outer circumferences of the torus is smaller.

The above-mentioned times and temperatures are given only by way of example. They generally depend on the properties of the type of glass chosen, on the dimensions of the torus-shaped lamp envelope and on the material of the bending mould.

In FIGS. 2a–2f, a holder 2 has suspended from it a tube 1 which is internally covered with a fluorescent powder FIG. 2a shows the position which the tube assumes after having been removed from the furnace. At the level of the lower end 3 of the tube there is a bending mould 4 on which the tube is bent by rolling the bending mould upwards vertically along the tube. The lower end 3 of the tube is clamped in a pair of tongs (not shown) secured to the bending mould. After the bending operation the position shown in FIG. 2b is obtained. Centrally above the torus-shaped bent tube there is a supporting member in the form of a suction tool 5 which is connected to a line 6 which can be moved vertically.

Preceding the instant denoted in FIG. 1 by $t_3$, cooling air denoted by an arrow pin in FIG. 2c is blown via the line 6 and suction tool 5 on the part of the tube, which is disposed opposite to the suction tool. Due to the blowing with cooling air, the tube locally becomes less soft so that the tube is prevented from deformation by depression by the suction tool in a subsequent step. A further advantage is that the suction tool is exposed to a less high temperature, which counteracts the detrition of the suction tool.

In FIG. 2d the suction tool is placed against the tube. The blowing with cooling air is then terminated and the tube is sucked against the suction tool, which is denoted by the arrow Q. The bending mould 4 may then be removed and returned to its initial position without the risk of deformation of the tube (FIG. 2e).

At the instant denoted in FIG. 1 by $t_4$ the cooperation of the suction tool with the tube is interrupted (FIG. 2f) after which the bent tube is ready for further processing.

In the part of the device according to the invention shown in FIG. 3 the suction tool 5 has a lower side 8 is suitable for cooperation with the outer circumference of a torus-shaped tube is formed as a hose of refractory material. Said hose is connected to the line or metal pipe 6 which is connected so as to be slidable in a holder 10. The pipe 6 is furthermore rigidly connected to an arm 11 which can move the pipe 6 in the axial direction by the action of a compressed air cylinder 12. The pipe 6 is furthermore connected to a hose 13 which communicates with a vacuum chamber and a hose 14 via which cooling air can be blown to the suction tool. The hoses 13 and 14 are flexible to enable the axial movement of the pipe.

We claim:

1. A method of manufacturing a torus-shaped lamp envelope which comprises softening a straight tube by heating, bending said tube in a vertical plane around a bending mould, cooling the tube to a temperature at which deformation of the shape of the torus as a result of gravity does not occur, supporting the tube at an instant between the instant at which the bending operation is completed and the instant at which the said temperature is reached, with at least one supporting member, said supporting member cooperating with the tube above a horizontal plane through the center of the torus, said supporting member being a suction tool connected to a suction line and designed to be placed against the outer circumference of the bent tube, interrupting the cooperation of the bending mould with the tube after the cooperation of the supporting member with the tube has been effected said method including prior to effecting the cooperation of the suction tool with the tube, the cooling of the part of the outer circumference of the tube disposed opposite to the suction tool by means of a cooling gas which is blown on the tube via the suction tool.

2. A device for manufacturing a torus-shaped lamp envelope which is particularly suitable for a fluorescent lamp, which device comprises a bending mould as well as means to bend a straight tube around said bending mould, which device furthermore comprises at least one supporting member for supporting the torus-shaped tube and movable with respect to the bent tube, characterized in that the supporting member is in the form of suction tool which can be connected to a suction line and which is designed to cooperate with the outer wall of the bent tube, said suction tool being selectively placed in fluid connection with a supply line for a cooling gas which can be closed.

* * * * *